US009895708B2

(12) United States Patent
McAndrew et al.

(10) Patent No.: US 9,895,708 B2
(45) Date of Patent: Feb. 20, 2018

(54) SYSTEM FOR DISPENSING MULTIPLE COMPONENT CHEMICAL SPRAYS

(71) Applicant: Akurate Dynamics LLC, Houston, TX (US)

(72) Inventors: Charles I. McAndrew, Magnolia, TX (US); Trey D. Cook, Houston, TX (US); Travis T. Brandt, Houston, TX (US); R. Ryan Snider, Cypress, TX (US); Kenneth D. Swatzel, III, Montgomery, TX (US); Edward R. Brewer, Houston, TX (US)

(73) Assignee: Akurate Dynamics LLC, Houston, TX (US)

( * ) Notice: Subject to any disclaimer, the term of this patent is extended or adjusted under 35 U.S.C. 154(b) by 245 days.

(21) Appl. No.: 14/854,092

(22) Filed: Sep. 15, 2015

(65) Prior Publication Data

US 2016/0107179 A1 Apr. 21, 2016

Related U.S. Application Data

(60) Provisional application No. 62/066,028, filed on Oct. 20, 2014, provisional application No. 62/165,225, filed on May 22, 2015.

(51) Int. Cl.
*B05B 9/00* (2006.01)
*B05B 12/10* (2006.01)
(Continued)

(52) U.S. Cl.
CPC .............. *B05B 9/002* (2013.01); *B05B 12/10* (2013.01); *B05B 12/1418* (2013.01); *B05B 7/1693* (2013.01)

(58) Field of Classification Search
CPC ... B05B 12/10; B05B 12/1418; B05B 7/1693; B05B 9/03; B05B 7/00–7/32; B05B 9/00–9/0894
(Continued)

(56) References Cited

U.S. PATENT DOCUMENTS 3,232,585 A 2/1966 Garbarino, Jr. et al.
3,921,901 A 11/1975 Woodman
(Continued)

*Primary Examiner* — Darren W Gorman
*Assistant Examiner* — Juan C Barrera
(74) *Attorney, Agent, or Firm* — Blank Rome, LLP

(57) ABSTRACT

A system for dispensing a plurality of chemicals includes a respective storage tank for each chemical. A respective metering, rotary positive displacement pump is in hydraulic communication at an inlet thereof with an outlet of each tank. An outlet of each pump is connected to a respective discharge hose. At least one heater is in thermal contact with each discharge hose. At least one temperature sensor is provided for measuring a temperature of each chemical in each respective discharge hose. A pressure sensor is provided for measuring pressure at an inlet end and at an outlet end of each discharge hose. A processor is in signal communication with each temperature sensor, each pressure sensor, a metering signal output of each pump and in control communication with each heater. The processor is programmed to operate each heater to maintain a temperature of each chemical such that a selected difference between pressure is measured between the inlet end and the discharge end of each discharge hose when each respective chemical is moved therethrough.

12 Claims, 1 Drawing Sheet

(51) Int. Cl.
*B05B 12/14* (2006.01)
*B05B 7/16* (2006.01)

(58) Field of Classification Search
USPC .................................. 239/130, 131, 135, 139
See application file for complete search history.

(56) References Cited

U.S. PATENT DOCUMENTS

| | | | | |
|---|---|---|---|---|
| 4,019,653 | A | 4/1977 | Scherer et al. | |
| 4,113,182 | A | 9/1978 | Brago | |
| 4,341,327 | A | 7/1982 | Zeitz | |
| 4,493,286 | A | 1/1985 | Carson | |
| 4,509,903 | A | 4/1985 | Fram | |
| 4,714,545 | A | 12/1987 | Bente et al. | |
| 4,789,100 | A * | 12/1988 | Senf .................... | B01F 13/0042 222/134 |
| 4,809,909 | A * | 3/1989 | Kukesh ..................... | B05B 7/24 239/1 |
| 4,928,880 | A | 5/1990 | Prus et al. | |
| 4,994,984 | A | 2/1991 | Massimo | |
| 5,388,761 | A | 2/1995 | Langeman | |
| 5,634,779 | A | 6/1997 | Eysymontt | |
| 6,315,161 | B1 * | 11/2001 | Bezaire ................. | B29B 7/7678 222/1 |
| 6,685,054 | B2 * | 2/2004 | Kameyama .......... | B67D 1/0037 222/129.3 |
| 7,350,672 | B1 * | 4/2008 | Gerich .................. | B05B 7/0408 137/607 |
| 8,251,603 | B2 * | 8/2012 | Kott ....................... | A46B 9/005 118/207 |
| 9,156,046 | B2 | 10/2015 | Jerdee et al. | |
| 9,174,234 | B2 * | 11/2015 | Snowwhite ........... | B05C 5/0279 |
| 2011/0031270 | A1 * | 2/2011 | Choiniere ............... | B05B 9/007 222/1 |
| 2012/0282121 | A1 * | 11/2012 | Kieffer .................. | B01F 15/042 417/410.1 |
| 2014/0084025 | A1 * | 3/2014 | Tix .......................... | F04B 17/03 222/135 |
| 2014/0166775 | A1 | 6/2014 | Courier | |
| 2014/0209630 | A1 * | 7/2014 | O'Leary ........... | B05C 17/00516 222/23 |
| 2014/0209703 | A1 * | 7/2014 | Jerdee ................... | F24H 9/1818 239/135 |

* cited by examiner

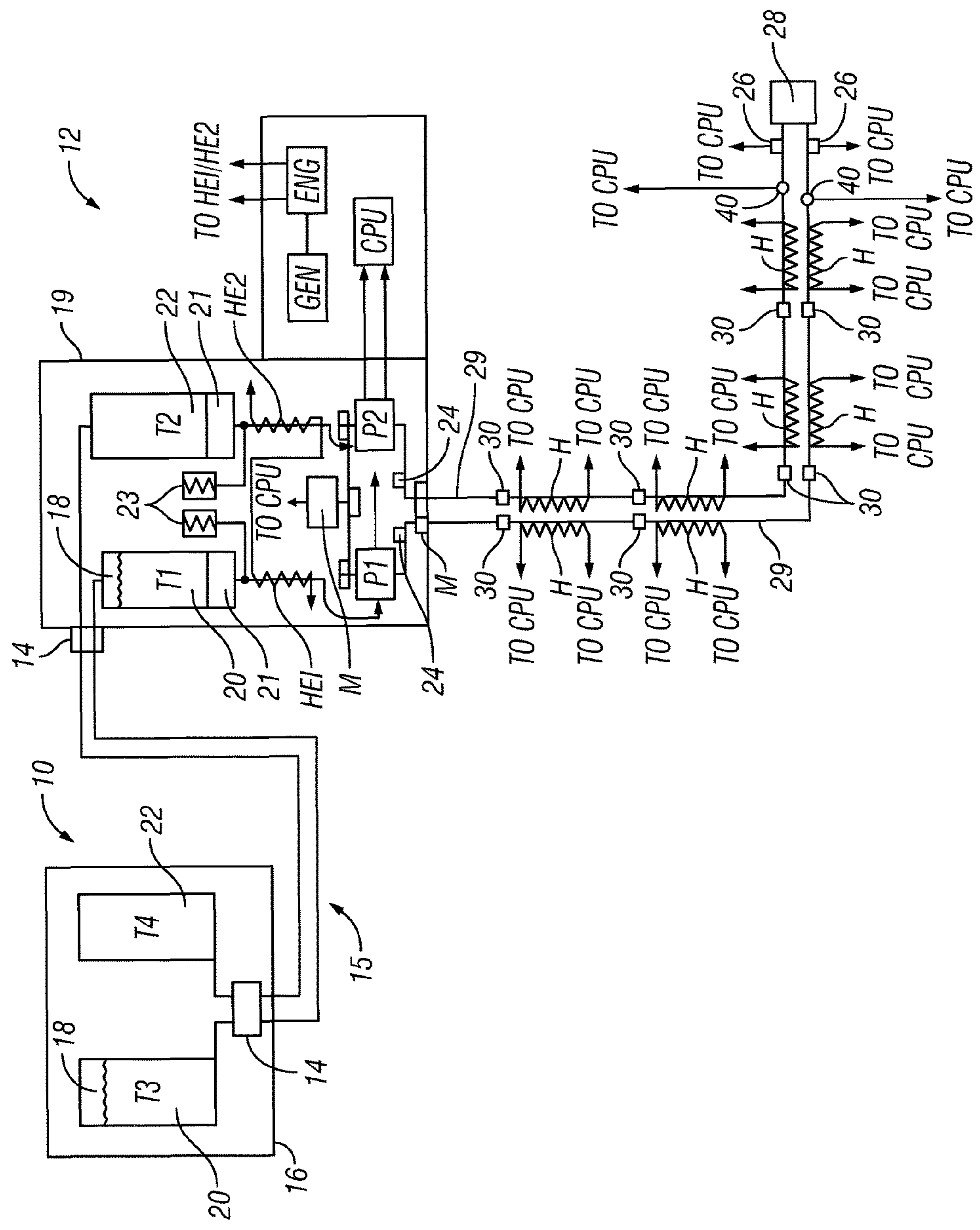
12
TO HEI/HE2
ENG
GEN
CPU
19
22
21
HE2
T2
P2
23
TO CPU
18
T1
P1
M
14
20
21
HEI
24
29
30
H
TO CPU
TO CPU
28
26
40
10
T4
T3
15
16

SYSTEM FOR DISPENSING MULTIPLE COMPONENT CHEMICAL SPRAYS

CROSS REFERENCE TO RELATED APPLICATIONS

Priority is claimed from U.S. Provisional Application No. 62/066,028 filed on Oct. 20, 2014 and U.S. Provisional Application No. 62/165,225 filed on May 22, 2015.

STATEMENT REGARDING FEDERALLY SPONSORED RESEARCH OF DEVELOPMENT

Not Applicable.

NAMES TO THE PARTIES TO A JOINT RESEARCH AGREEMENT

Not Applicable.

BACKGROUND

This disclosure is related to the field of systems for spray application of multiple component liquid compounds, wherein the multiple components are mixed at the point of spray application. More specifically, the disclosure relates to systems for such spray application which require very precise control over the volume and/or mass flow rate of each of a plurality of liquid chemicals when applied by a spray gun.

Spraying systems known in the art for application of multiple component liquid chemicals known in the art include reciprocating-type pumps having inlets disposed in standard sized containers, e.g., 55 gallon drums. The reciprocating pumps are selectively actuated to move each of a plurality of liquid chemicals through respective hoses to a spray application “gun” or sprayer, wherein the plurality of liquid chemicals is mixed at the point of application of the spray discharged from the sprayer. Discharge from the pumps is conducted to the spray gun through respective hoses. Such systems may or may not include a separate hose for introduction of gas under pressure, such as air, to help atomize the liquid chemicals for spray application. Examples of such multiple component liquid chemicals include thermal insulation which may consist of two liquid components to be mixed at the point of application. The two liquid components react at the point of application to form a foam, which eventually cures into finished insulation.

Manufacturers of multiple component liquid chemical compounds specify the volume and/or mass of each component that is required to be dispensed so that the correct chemical reaction or other physical process (e.g., evaporation) takes place at the point of application. Using systems known in the art for spray applying multiple component chemicals may not have sufficient accuracy in determining the volume and/or mass flow rate of each component chemical to dispense the manufacturer-specified amount of each component chemical when the spray is actually applied.

Systems known in the art may also allow environmental and personnel hazards resulting from use of chemical withdrawn from open containers, and from the users being required to transfer the pump inlets from empty chemical containers to full ones when containers are emptied. The former limitation of systems known in the art results from the temperature of the sprayed component chemicals being uncontrolled, and from lack of accuracy in measurement of volume and/or mass of each liquid component actually moved by reciprocating-type liquid pumps. A further environmental exposure may result from the need to dispose of empty liquid containers. Some liquid chemicals may be reactive with ambient air, and as a result using containers that are exposed to the air when opened may enable degrading of such reactive chemicals.

BRIEF DESCRIPTION OF THE DRAWINGS

FIG. 1 shows an example embodiment of a system according to the present disclosure.

DETAILED DESCRIPTION

FIG. 1 shows an example embodiment of a multiple component spray applicator system according to the present disclosure. The system may include a bulk storage filling unit 10 and a chemical dispensing unit 12. The bulk storage filling unit 10 and the chemical dispensing unit 12 may each be disposed in a respective protective housing 16, 19. The protective housings 16, 19 may each be mounted to a separate road-mobile platform such as a trailer or truck (not shown).

The bulk storage filling unit 10 may include an individual chemical storage tank, shown at T3, T4, for each of a plurality of separate chemicals to be dispensed by the chemical dispensing unit 12. In the present example embodiment, there are two chemical storage tanks T3 and T4, however the number of such tanks is not a limitation on the scope of the present disclosure. For chemicals that may be reactive with ambient air, one or more of the chemical storage tanks, T3 in the present example embodiment, may include a non-reactive gas 18 disposed above a first liquid chemical 20 disposed in the chemical storage tank T3. An example gas is nitrogen, although the composition of the non-reactive gas and its pressure are not to be construed as limitations on the scope of the present disclosure. A second liquid chemical 22 may be disposed in the other chemical storage tank T4. The protective housing 16 may include a dry-connect valve 14 for connection of filling hoses 15 to a corresponding dry-connect valve in the housing 18 of the chemical dispensing unit 12. The chemical storage tanks T3 and T4 may be of a type that may be filled by the provider of the liquid chemicals in a manner that substantially eliminates exposure of the liquid chemicals to the atmosphere. The chemical storage tanks T3 and T4 may also be resistant to damage in the event of a vehicle collision. In some embodiments, the chemical storage tanks T3, T4 may be 660 gallon, sealed, certified road hazard resistant tanks.

The chemical dispensing 12 unit may include a separate supply tank T1, T2 for each of the separate liquid chemicals 20, 22 to be applied by spraying. As explained above, the protective housing 19 of the chemical dispensing unit may include a dry-connect valve 14 for coupling the filling hoses 15 thereto when it is necessary to refill the supply tanks T1, T2. As is the case for the bulk storage filling unit 10, any one or more of the supply tanks T1, T2 in the chemical dispensing unit 12 may include a non-reactive gas 18, e.g., nitrogen, for chemicals that may be reactive with ambient air. The interior of the chemical dispensing unit protective housing 19 may be thermally insulated so that the temperature inside the protective housing 19 is maintained at a selected temperature. By maintaining the interior of the housing at a selected temperature, the chemical dispensing unit 12 may be used at locations where the ambient temperature may otherwise be too low for proper withdrawal of the liquid chemicals 20, 22 from the respective supply tanks T1, T2.

An outlet of each supply tank T1, T2 in the chemical dispensing unit 12 may be coupled to an inlet of a respective low pressure transfer pump 21. The low pressure transfer pumps 21 may be coupled at their respective discharges to an inlet of a respective applicator pump P1, P2. The outlet of each low pressure transfer pump 21 may be in pressure communication with an accumulator 23. The low pressure transfer pumps 21 and accumulators 23 maintain a minimum pressure in the inlet to each applicator pump P1, P2 so as to reduce the possibility of cavitation therein.

The applicator pumps P1, P2, may be, for example, positive displacement pumps such as vane type pumps, gear type pumps or axial screw type pumps which may include a rotary encoder or similar sensor to generate a signal corresponding to movement of each applicator pump P1, P2 and as a result corresponding to the actual volume of fluid moved by each applicator pump P1, P2. In some embodiments, one or more flow meters, e.g., as shown at 40, may be installed in each chemical delivery hose (described below) to autonomously measure volume flow. The applicator pumps P1, P2 may be rotated by an electric motor M. In one example embodiment one electric motor may rotate both applicator pumps P1, P2, however in the other embodiments there may be one motor for each respective pump. A conduit connecting each transfer pump 21 to a respective applicator pump P1, P2 may be thermally coupled to a respective heat exchanger HE1, HE2. The heat exchangers HE1, HE2 may be liquid-to-liquid heat exchangers and may be heated by liquid coolant from an engine ENG disposed in or on the protective housing 19, or on a separate part of the chemical dispensing unit 12. In such embodiments, waste heat from the engine ENG may be used to preheat the liquid chemicals 20, 22 to reduce the amount of power consumed by the respective applicator pumps P1, P2. The engine ENG may be used to drive a generator GEN or similar source of electric power for use by the chemical dispensing unit 12.

Discharge from each of the two applicator pumps P1, P2 may be conducted to another dry connect valve 14, wherein respective chemical delivery hoses 29 may conduct the discharged liquid chemicals 20, 22 to a spray gun 28.

In the present example embodiment, the chemical delivery hoses 29 may each include a plurality of heaters H, for example, electrically operated resistance heaters, disposed at spaced apart locations along the length of each chemical delivery hose 29. Each chemical spray hose 29 may have a temperature sensor 30 disposed therein proximate to each heater H.

A first pressure sensor 24 may be in pressure communication with the discharge side of each applicator pump P1, P2 to measure pressure of the chemical as it is being discharged into each chemical delivery hose 29. A second pressure sensor 26 may be in pressure communication with an interior of each chemical delivery hose 29 proximate the spray gun 28.

A central processor CPU, which may be implemented in any form such as and without limitation a microprocessor, programmable logic controller, floating programmable gate array or an application specific integrated circuit may accept as input signals from the temperature sensors 30 and the first 24 and second 26 pressure sensors. The central processor CPU may also accept as input measurements of volume of liquid pumped from each of the applicator pumps P1, P2. The central processor CPU may operate the motor(s) M and the heating elements H.

In the present example embodiment, the heating elements H may be operated by the CPU to maintain a temperature of the liquid chemical 20, 22 in each chemical delivery hose 29 at a temperature such that the respective viscosity of each chemical 20, 22 is at a selected value. By selecting a temperature for each liquid chemical to be maintained at a selected viscosity, a pumping rate of each liquid chemical 20, 22 through each respective chemical delivery hose 29 may be more precisely controllable. A relationship exists between viscosity of each liquid chemical 20, 22 and its temperature. For purposes of more precise control over the volume and/or mass flow rate of each liquid chemical 20, 22 through the respective chemical delivery hose 29, measurement of difference between fluid pressure at the first pressure sensors 24 and the second pressure sensors 26 may be calculated in the central processor CPU. In the present embodiment, pressure differences may be used by the central processor CPU to adjust the temperature measured at each of the temperature sensors 30 by operating respective ones of the heaters H so that a selected pressure difference is maintained during spray application of each of the liquid chemicals 20, 22. By adjusting temperature so that selected pressure differences are maintained, more precise control over respective flow rates of each liquid chemical 20, 22 may be maintained. The central processor CPU may also record with respect to time measurements of fluid mass and/or volume measured by measuring rotation of the applicator pumps P1, P2 as the liquid chemicals 20, 22 are sprayed during application.

In some embodiments, each supply tank T1, T2 in the chemical dispensing unit 12 may include a liquid level sensor 32, such an acoustic ranging sensor, capacitance sensor or any other sensor capable of measuring liquid level in the supply tanks T1, T2. Measurements of liquid level in each supply tank T1, T2 may be conducted to the central processor CPU. The central processor CPU may generate a warning indication or may provide a liquid level display to the system user so that when the supply tanks T1, T2 require refilling, the user may be advised of such condition.

In some embodiments, changes in liquid level in each supply tank T1, T2 may be used to calibrate the metering output of each applicator pump P1, P2. Because the volume of each supply tank T1, T2 is known, a total liquid volume removed from each supply tank T1, T2 may be calculated, e.g., in the central processor CPU using measurements from the liquid level sensors 32. Such known volume may be compared to the metered volume measured by each applicator pump P1, P2; differences between the pump measured volume and the liquid level-determined volume may be used by the CPU to recalibrate the metering signal from each applicator pump P1, P2.

While the example embodiment in FIG. 1 shows one set of chemical delivery hoses 29 and one spray gun 28, it will be appreciated by those skilled in the art that in other embodiments more than one set of pumps and/or more than one set of chemical delivery hoses and spray guns may be used.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system for dispensing a plurality of chemicals, comprising: a respective storage tank for each chemical;

a respective pump in hydraulic communication at an inlet thereof with an outlet of each tank, an outlet of each pump connected to a respective discharge hose, each pump having a sensor associated therewith to generate a metering signal;

at least one heater in thermal contact with each discharge hose;

at least one temperature sensor for measuring a temperature of each chemical in each respective discharge hose;

a pressure sensor for measuring pressure at an inlet end and at an outlet end of each discharge hose; and a processor in signal communication with each temperature sensor, each pressure sensor, the sensor of each pump and in control communication with each heater, wherein the processor is programmed to operate each heater to maintain a temperature of each chemical such that a selected difference between pressure is measured between the inlet end and the discharge end of each discharge hose when each respective chemical is moved therethrough.

2. The system of claim 1 wherein the discharge end of each discharge hose is coupled to a spray application gun.

3. The system of claim 1 further comprising a plurality of heaters in thermal contact with longitudinal segments of each discharge hose, each of the plurality of heaters in control communication with the processor.

4. The system of claim 1 wherein at least one of the chemical tanks comprises an inert gas disposed therein.

5. The system of claim 1 further comprising for each storage tank a transfer pump having an inlet end in fluid communication with the outlet of the storage tank, an outlet of a respective transfer pump in fluid communication with the inlet of a respective metering, rotary positive displacement pump.

6. The system of claim 5 further comprising a respective accumulator in pressure communication with an inlet of each metering, rotary positive displacement pump.

7. The system of claim 1 wherein each heater comprises an electrical resistance heater.

8. The system of claim 1 further comprising a heat exchanger in thermal communication at an output side thereof with each respective chemical between an outlet of the respective tank and an inlet to the respective metering, rotary positive displacement pump.

9. The system of claim 8 wherein an input side of the heat exchanger is in thermal communication with an engine.

10. The system of claim 9 wherein the heat exchanger is a liquid to liquid heat exchanger and the engine is liquid cooled.

11. The system of claim 9 wherein the engine drives an electric power generator used to operate pumps and the processor.

12. The system of claim 1 wherein each pump comprises a metering rotary positive displacement pump.

* * * * *